UNITED STATES PATENT OFFICE.

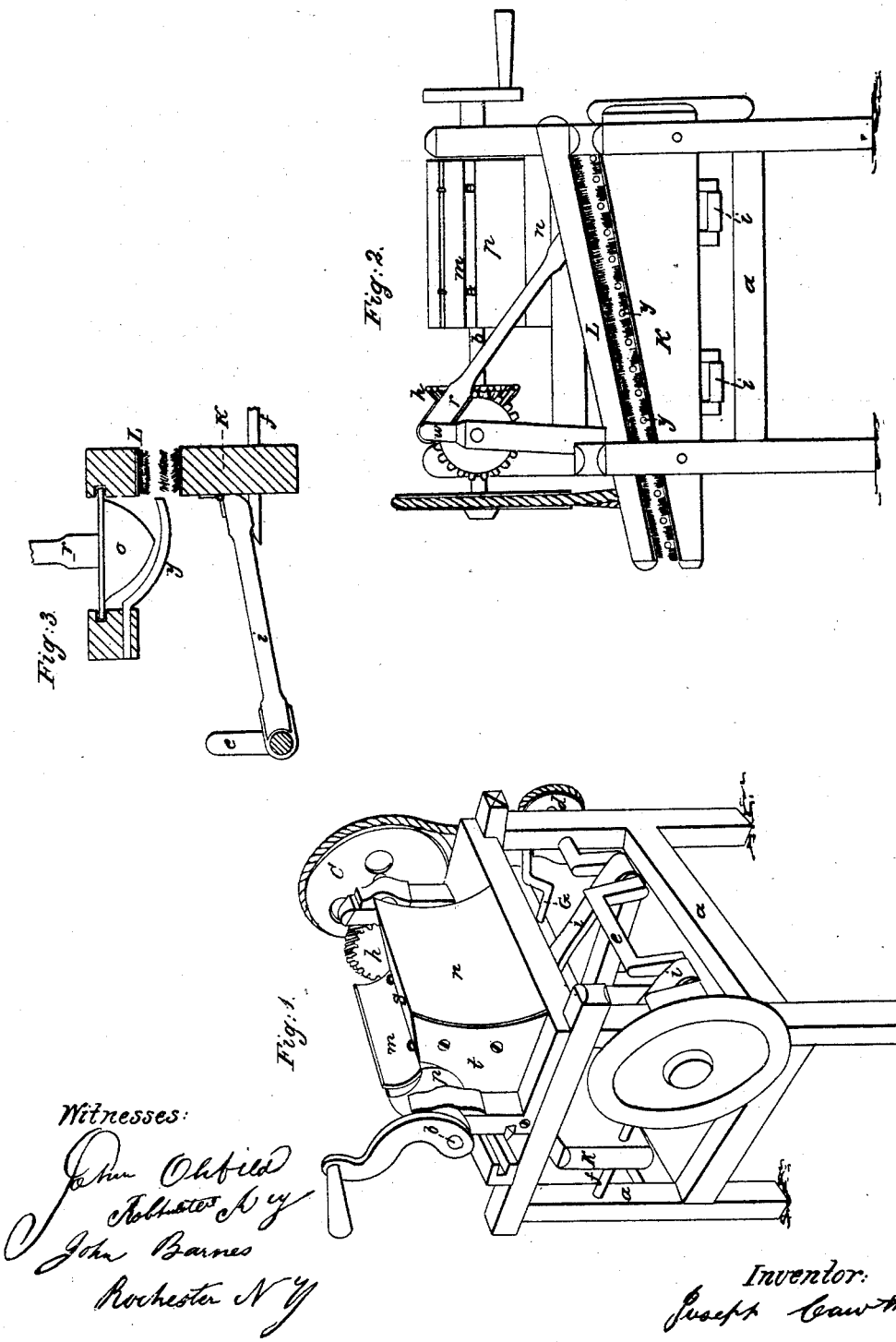

JOSEPH CAWTHRA, OF ROCHESTER, NEW YORK.

CORN-HUSKER.

Specification of Letters Patent No. 20,253, dated May 18, 1858.

*To all whom it may concern:*

Be it known that I, JOSEPH CAWTHRA, of Rochester, in the county of Monroe and State of New York, have invented a new and useful Improvement in Machines for Husking Corn; and I do hereby declare that the following is a full, clear, and exact description of the construction and operation of the same, reference being had to the accompanying drawings, making part of this specification, and to the letters of reference marked thereon.

Figure 1, is a perspective view of my machine, Fig. 2, is a longitudinal elevation, Fig. 3, is a transverse section of some of the parts detached hereinafter described.

The same letters refer to like parts in each of the figures.

To enable others to make and use my invention I will describe its construction and operation.

It consists of a frame $a$ $a$, Fig. 1, having a transverse shaft, $b$, placed upon suitable bearings at the top thereof. This shaft carries a roller, $p$, having one or more longitudinal grooves in its surface. for the reception of the ears of corn which are to be husked. A crank is attached for turning the roller shaft by hand, or mechanical power may be applied for the purpose. In front of the rollers is a concave, $n$, on the end of which a circular knife, $t$, is attached, its edge being in close contact with the end of the roller, $p$. On the top of this concave the ears are fed to the roller, by being placed one at a time in the groove in its face, with their butt ends at the knife end of the concave. The revolution of the roller carries the ear downward, forcing the butt or stem upon the edge of the knife, $t$, and severing it from the ear. A spring concave, $m$, is fitted within the groove of the feed roller, for the purpose of adapting it to ears of various sizes. It is held forward by two springs on its convex side, which yield to accommodate ears of a large size, and at the same time press them upon the edge of the knife.

As the revolution of the roller brings the groove underneath, the ear, having passed the concave, and its stem being severed by the knife, $t$, drops on an inclined grate composed of a series of curved rods or wires, one of which is seen at, $y$, in the section Fig. 3. The ends are also shown at, $y$, $y$, Fig. 2, by which the inclination of the grate may be seen. The ear falls on the elevated end of the grate, and will gradually descend to the lower end by gravitation being aided by its motion as dropped from the roller. While descending the grate it is acted upon by the husker, $k$, which consists of a bar the length of the grate, provided with a series of bent wire teeth, Fig. 3, arranged in groups corresponding to the spaces between the rods of the grate, $y$. The husker has a reciprocating motion on the rod, $f$, and directly under the grate so that its teeth seize upon the husks and silks adhering to the ear, and strip or rather comb them off in its forward motion. A piece, L, provided with similar teeth directly above the husker, and at the end of the rods of the grate, $y$, prevents the ear being carried off the grate by the husker, and also clears it, on its return motion, of any refuse matter which adheres to it. This in turn is cleaned by the husker in its forward motion, the shape of the teeth being such as to effect this result.

The motion of the husker tends to keep the ear revolving, which thereby presents every part of its surface to the action of its teeth.

Lest the downward or sliding motion of the ears should be arrested by the husker, a slide or follower, O, is provided for carrying them down the grate. It is attached to the end of a pitman, $r$, which is connected with the crank, $w$, on the shaft of a miter-wheel, which gears with wheel, $h$, on shaft, $b$. It therefore has a reciprocating motion a distance equal to the length of the roller, $p$, and its stroke commences at the top of the grate, just after the ear is dropped upon it, carrying it down that distance. It returns in time to follow the next in the same manner.

The motion of the husker is given by the two cranks $i$ $i$ on the shaft. $c$, on which the small pulley, $d$, is driven by a cross-band from the large pulley, C, which gives the husker a quick motion.

The operation of the machine performs successfully the processes of severing the stem, and removing all husks and silks however closely they may adhere.

What I claim as my invention and desire to secure by Letters Patent is—

The inclined reciprocating husker, $k$, constructed as described in combination with stationary teeth, L, the inclined curved grate, $y$, and the slide, O, when these several parts are constructed, arranged and operated substantially as and for the purpose set forth.

Rochester May 5th 1858.

JOSEPH CAWTHRA. [L. S.]

Witnesses:
    JOHN OLDFIELD, [L. S.]
    JOHN BARNES. [L. S.]